United States Patent
Mori et al.

(10) Patent No.: US 10,793,145 B2
(45) Date of Patent: Oct. 6, 2020

(54) OBJECT RECOGNITION DEVICE, OBJECT RECOGNITION METHOD, AND VEHICLE CONTROL SYSTEM

(71) Applicant: Mitsubishi Electric Corporation, Tokyo (JP)

(72) Inventors: Masanori Mori, Tokyo (JP); Koji Iida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 325 days.

(21) Appl. No.: 15/817,633

(22) Filed: Nov. 20, 2017

(65) Prior Publication Data

US 2018/0356820 A1  Dec. 13, 2018

(30) Foreign Application Priority Data

Jun. 8, 2017 (JP) .................................. 2017-113497

(51) Int. Cl.
| | |
|---|---|
| *B60W 30/08* | (2012.01) |
| *G08G 1/16* | (2006.01) |
| *G05D 1/02* | (2020.01) |
| *B60W 30/095* | (2012.01) |
| *B60W 30/085* | (2012.01) |
| *B60W 30/09* | (2012.01) |
| *G05D 1/00* | (2006.01) |
| *G06K 9/00* | (2006.01) |

(Continued)

(52) U.S. Cl.
CPC .......... *B60W 30/08* (2013.01); *B60W 30/085* (2013.01); *B60W 30/09* (2013.01);
(Continued)

(58) Field of Classification Search
CPC .... B60W 30/08; B60W 30/09; B60W 30/085; B60W 30/0956; B60W 30/0953;
(Continued)

(56) References Cited

U.S. PATENT DOCUMENTS

| | | | |
|---|---|---|---|
| 7,254,504 B2 * | 8/2007 | Klotz et al. ........... | G01S 13/931 702/89 |
| 2003/0060936 A1 * | 3/2003 | Yamamura et al. ... | G08G 1/166 701/1 |

(Continued)

FOREIGN PATENT DOCUMENTS

| | | |
|---|---|---|
| JP | 06-504131 A | 5/1994 |
| JP | 2001-324560 A | 11/2001 |

(Continued)

OTHER PUBLICATIONS

Communication dated Jun. 26, 2018 issued by the Japanese Patent Office in counterpart application No. 2017-113497.

(Continued)

*Primary Examiner* — Dale W Hilgendorf
(74) *Attorney, Agent, or Firm* — Sughrue Mion, PLLC; Richard C. Turner (57) ABSTRACT

Provided are an object recognition device and the like configured to associate, for detected object data and detected ego vehicle data that are received from respective sensors in a period from a previous processing time to a current processing time, an object data time with each piece of the detected object data, and an ego vehicle data time with each piece of the detected ego vehicle data, predict the detected ego vehicle data at the object data time to generate a result of the prediction as corrected ego vehicle data, and predict updated object data at the object data time to generate a result of the prediction as predicted object data.

9 Claims, 5 Drawing Sheets

(51) Int. Cl.
*G06N 20/00* (2019.01)
*G06N 5/04* (2006.01)

(52) U.S. Cl.
CPC ...... *B60W 30/095* (2013.01); *B60W 30/0953* (2013.01); *B60W 30/0956* (2013.01); *G05D 1/0088* (2013.01); *G05D 1/0238* (2013.01); *G06K 9/00805* (2013.01); *G08G 1/163* (2013.01); *G08G 1/165* (2013.01); *G08G 1/166* (2013.01); *G06N 5/04* (2013.01); *G06N 20/00* (2019.01)

(58) Field of Classification Search
CPC ..... B60W 30/095; G08G 1/165; G08G 1/166; G08G 1/163; G05D 1/0238; G05D 1/0088; G06K 9/00805; G06N 20/00; G06N 5/04
See application file for complete search history.

(56) References Cited

U.S. PATENT DOCUMENTS

| | | | | |
|---|---|---|---|---|
| 2009/0037052 | A1* | 2/2009 | Ogasawara et al. | G08G 1/165 701/301 |
| 2011/0054793 | A1* | 3/2011 | Harada et al. | G08G 1/166 701/301 |
| 2011/0190972 | A1* | 8/2011 | Timmons et al. | G08G 1/166 701/31.4 |
| 2012/0089292 | A1 | 4/2012 | Naimark et al. | |
| 2014/0142839 | A1* | 5/2014 | Kanninade | G08G 1/166 701/301 |
| 2018/0238696 | A1* | 8/2018 | Takeda | B60W 30/095 |

FOREIGN PATENT DOCUMENTS

| | | |
|---|---|---|
| JP | 2002-341014 A | 11/2002 |
| JP | 2003-223224 A | 8/2003 |
| JP | 2006-349602 A | 12/2006 |
| JP | 2007-279892 A | 10/2007 |
| JP | 2013-015411 A | 1/2013 |
| JP | 5698618 B2 | 4/2015 |
| WO | 03/008996 A1 | 1/2003 |

OTHER PUBLICATIONS

Communication dated Oct. 2, 2018 issued by the Japanese Patent Office in counterpart application No. 2017-113497.

* cited by examiner

OBJECT RECOGNITION DEVICE, OBJECT RECOGNITION METHOD, AND VEHICLE CONTROL SYSTEM

BACKGROUND OF THE INVENTION

1. Field of the Invention

The present invention relates to an object recognition device and an object recognition method for estimating a state of an object detected by a sensor mounted on an ego vehicle, and a vehicle control system including the object recognition device.

2. Description of the Related Art

A related-art object recognition device is mounted on an ego vehicle, and is configured to recognize surrounding objects of the ego vehicle by processing data received from one or a plurality of sensors, which are configured to detect information on a state of each object as detected object data. Moreover, a vehicle control system, for example, an automatic driving system is configured to perform various kinds of vehicle control, such as automatic braking and inter-vehicle distance maintaining control, using results of recognizing the objects by the object recognition device.

Now, in order to accurately recognize the objects while the ego vehicle is moving, there is a need to calculate an absolute velocity of each detected object detected by the sensors, and to determine whether the detected object is a moving object or a stationary object, for example. Therefore, in the related art, there has been proposed a technology in which a ego vehicle velocity and a relative velocity of the detected object, which is detected by a sensor with respect to the sensor, are acquired, the absolute velocity of the detected object is calculated on the assumption that a time at which the ego vehicle velocity is acquired is caused to lag by a lag amount d, and the lag amount d with which the number of objects having the absolute velocity (that is, difference between the ego vehicle velocity and the relative velocity) of 0 is maximized is estimated, to thereby correct a time lag of the ego vehicle velocity (see Japanese Patent No. 5698618, for example).

In the related art disclosed in Japanese Patent No. 5698618, there is adopted a configuration in which, assuming that most of the objects detected by the sensors are stationary objects, the time lag of the ego vehicle velocity is estimated from the relative velocity of the detected object, which is detected by the sensor.

However, with the above-mentioned configuration, when the ego vehicle is stopped or moving at a constant velocity, both a relative velocity of the stationary object and the ego vehicle velocity are not changed, and hence the time lag amount d cannot be estimated. In addition, with the above-mentioned configuration, the relative velocity of the detected object contains an error, and the error and the time lag cannot be distinguished from each other as factors for causing the difference between the relative velocity of the stationary object and the ego vehicle velocity, with the result that the time lag amount d is erroneously estimated.

Therefore, in order to accurately recognize the objects while the ego vehicle is moving, there is a demand for a technology that is different from the related art disclosed in Japanese Patent No. 5698618.

SUMMARY OF THE INVENTION

The present invention has been made to solve the above-mentioned problem, for example, and therefore has an object to provide an object recognition device and an object recognition method, which are capable of estimating a state of an object detected by a sensor mounted on an ego vehicle even when the ego vehicle moves, and a vehicle control system including the object recognition device.

According to one embodiment of the present invention, there is provided an object recognition device, which is configured to generate and output updated object data and corrected ego vehicle data based on detected object data received from an object information sensor, and on detected ego vehicle data received from a vehicle information sensor, the object recognition device including: a time measuring unit configured to measure a time; a data receiving unit configured to associate, for the detected object data and the detected ego vehicle data that are received in a period from a previous processing time immediately preceding a current processing time to the current processing time, a time measured by the time measuring unit as an object data time with each piece of the detected object data, and a time measured by the time measuring unit as an ego vehicle data time with each piece of the detected ego vehicle data to output the detected object data, the object data time, the detected ego vehicle data, and the ego vehicle data time; a prediction processing unit configured to predict, with inputs of the object data time, the detected ego vehicle data, and the ego vehicle data time that are output by the data receiving unit, the detected ego vehicle data at the object data time to generate and output a result of the prediction as the corrected ego vehicle data, and predict, with inputs of the updated object data, and the object data time that is output by the data receiving unit, the updated object data at the object data time to generate and output a result of the prediction as predicted object data; a correlation processing unit configured to determine, with inputs of the detected object data that is output by the data receiving unit, and the predicted object data and the corrected ego vehicle data that are output by the prediction processing unit, a correspondence between the detected object data and the predicted object data to generate and output a combination of the corrected ego vehicle data, the detected object data, the predicted object data, and the correspondence as correlation data; and an update processing unit configured to generate, with an input of the correlation data that is output by the correlation processing unit, and using the detected object data and the predicted object data that correspond to each other, the updated object data at the object data time to output the updated object data and the corrected ego vehicle data at the object data time.

According to one embodiment of the present invention, there is provided an object recognition method for generating and outputting updated object data and corrected ego vehicle data based on detected object data received from an object information sensor, and on detected ego vehicle data received from a vehicle information sensor, the object recognition method including: associating, for the detected object data and the detected ego vehicle data that are received in a period from a previous processing time immediately preceding a current processing time to the current processing time, an object data time with each piece of the detected object data, and an ego vehicle data time with each piece of the detected ego vehicle data to output the detected object data, the object data time, the detected ego vehicle data, and the ego vehicle data time; predicting, with inputs of the object data time, the detected ego vehicle data, and the ego vehicle data time, the detected ego vehicle data at the object data time to generate and output a result of the prediction as the corrected ego vehicle data, and predicting, with inputs of the updated object data and the object data time, the updated object data at the object data time to generate and output a result of the prediction as predicted object data; determining, with inputs of the detected object data, the predicted object data, and the corrected ego vehicle data, a correspondence between the detected object data and the predicted object data to generate and output a combination of the corrected ego vehicle data, the detected object data, the predicted object data, and the correspondence as correlation data; and generating, with an input of the correlation data, and using the detected object data and the predicted object data that correspond to each other, the updated object data at the object data time to output the updated object data and the corrected ego vehicle data at the object data time.

According to one embodiment of the present invention, there is provided a vehicle control system including: the object recognition device; and a vehicle control device configured to control a vehicle in accordance with the updated object data and the corrected ego vehicle data that are output by the object recognition device.

According to the present invention, it is possible to provide the object recognition device and the object recognition method, which are capable of estimating the state of the object detected by the sensor mounted on the ego vehicle even when the ego vehicle moves, and the vehicle control system including the object recognition device.

DESCRIPTION OF THE EMBODIMENTS

Now, an object recognition device, an object recognition method, and a vehicle control system according to a preferred embodiment of the present invention are described with reference to the accompanying drawings. In the illustration of the drawings, the same or corresponding components are denoted by the same reference symbols, and the overlapping description thereof is omitted.

First Embodiment

Figure 1:
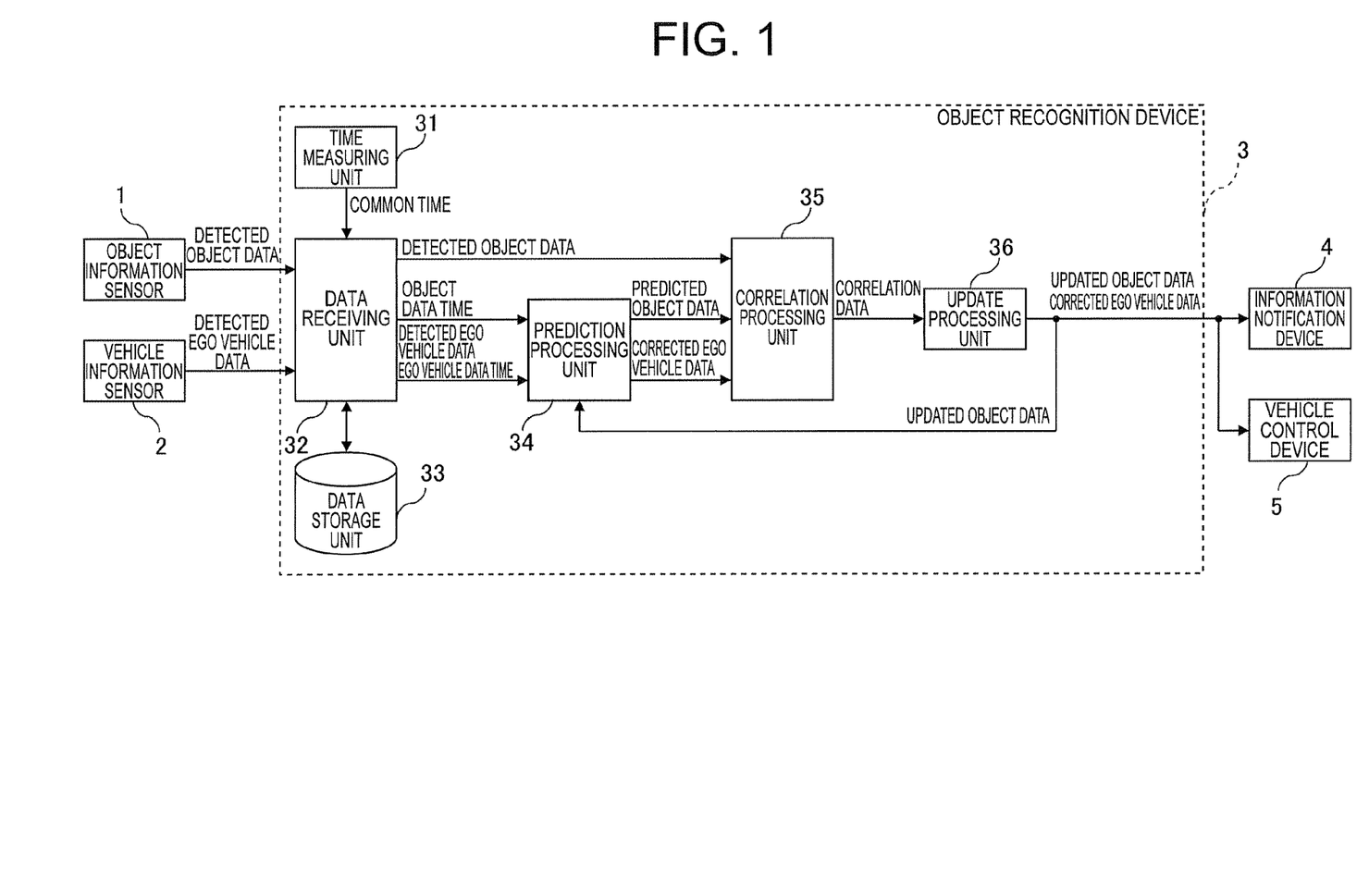
FIG. 1 is a block diagram for illustrating a configuration of a vehicle control system according to a first embodiment of the present invention.

FIG. 1 is a block diagram for illustrating a configuration of a vehicle control system according to a first embodiment of the present invention. In FIG. 1, the vehicle control system includes an object information sensor 1, a vehicle information sensor 2, an object recognition device 3, an information notification device 4, and a vehicle control device 5.

The object information sensor 1 is mounted on an ego vehicle, and is configured to detect, as detected object data, information on a state of an object around the ego vehicle that exists in a detectable range to transmit the detected object data to the object recognition device 3.

The detected object data includes, for example, a relative position of the object with respect to the ego vehicle on which the object information sensor 1 is mounted, and a relative velocity, an object type, and other such information of the object.

As the object information sensor 1, there may be used a sensor of a type that detects a distance to the object, an azimuth of the object, the relative velocity of the object, and other such information by receiving light, electromagnetic waves, and other such detected waves radiated from the object, and performing signal processing, image processing, and other such processing on the received detected waves, for example. As the object information sensor 1, there may also be used a sensor of a type that detects the distance to the object, the azimuth of the object, the relative velocity of the object, and other such information by irradiating the object with detection waves, receiving the detection waves reflected from the object, and performing processing on the received detection waves.

Specifically, for example, a millimeter wave radar, a laser radar, an ultrasonic sensor, an infrared sensor, an optical camera, and other types of sensors may be used as the object information sensor 1. As a specific example, a case of using a single object information sensor 1 is described below, but a plurality of object information sensors 1 may be used.

The vehicle information sensor 2 is configured to detect the information on a state of the ego vehicle as detected ego vehicle data to transmit the detected ego vehicle data to the object recognition device 3.

The detected ego vehicle data includes a velocity, a wheel speed, a steering angle, a yaw rate, and other such information of the ego vehicle, for example.

The object recognition device 3 includes a time measuring unit 31, a data receiving unit 32, a data storage unit 33, a prediction processing unit 34, a correlation processing unit 35, and an update processing unit 36. The object recognition device 3 is implemented by a microcomputer configured to execute arithmetic processing, a read only memory (ROM) configured to store program data, fixed-value data, and other such data, a random access memory (RAM) configured to have stored data updated and sequentially rewritten, a communication device configured to transmit and receive data, and a timer configured to measure time, for example.

The time measuring unit 31 is configured to measure a time in the object recognition device 3. The time measured by the time measuring unit 31 is hereinafter referred to as a "common time".

The data receiving unit 32 is configured to receive the detected object data from the object information sensor 1, and receive the detected ego vehicle data from the vehicle information sensor 2. The data receiving unit 32 is also configured to associate the common time measured by the time measuring unit 31 as an associated time with each piece of received data. Timings at which the sensors detect the respective pieces of data do not always need to be synchronized, and timings at which the data receiving unit receives the respective pieces of data do not need to be synchronized, either.

Regarding the associated time associated with each piece of data, as long as the associated times of the respective pieces of data are arranged in order of reception of the respective pieces of data, a time of any kind may be adopted as the time to be associated with each piece of data.

For example, a time at which the data receiving unit 32 receives data may be measured by the time measuring unit 31, and the measured time may be used as the associated time to be associated with the data. In the first embodiment, there is exemplified a case in which the data receiving unit 32 is configured to associate a reception time at which the detected object data is received from the object information sensor 1 with the detected object data, and associate a reception time at which the detected ego vehicle data is received from the vehicle information sensor 2 with the detected ego vehicle data.

The associated time that is associated with the detected object data is hereinafter referred to as an object data time, and the associated time that is associated with the detected ego vehicle data is referred to as an ego vehicle data time.

The data receiving unit 32 outputs, to the correlation processing unit 35, the detected object data that is received from the object information sensor 1, and outputs, to the prediction processing unit 34, the object data time that is associated with the detected object data. The data receiving unit 32 also outputs, to the prediction processing unit 34, the detected ego vehicle data that is received from the vehicle information sensor 2, and the ego vehicle data time that is associated with the detected ego vehicle data.

The data storage unit 33 is configured to store, as necessary, the data received by the data receiving unit 32 along with the associated times that are associated with respective pieces of the data.

The prediction processing unit 34 is configured to predict, with inputs of the detected ego vehicle data, the ego vehicle data time associated with the detected ego vehicle data, and the object data time that are output by the data receiving unit 32, the detected ego vehicle data at the object data time to generate a result of the prediction as corrected ego vehicle data. Examples of a method of generating the corrected ego vehicle data are described later.

The prediction processing unit 34 is configured to predict, with inputs of updated object data output by the update processing unit 36, which is to be described later, and the object data time input from the data receiving unit 32, the updated object data at the object data time to generate a result of the prediction as predicted object data. As a method of predicting the updated object data at the object data time, a known technology may be applied, and a detailed description of the method is omitted here.

The updated object data includes information on the state of the object detected by the object information sensor 1, and includes the relative position of the object with respect to the ego vehicle on which the object information sensor 1 is mounted, the relative velocity of the object, a relative acceleration of the object, the object type, and other such information, for example.

The correlation processing unit 35 is configured to determine, with inputs of the detected object data that is output by the data receiving unit 32, and the predicted object data and the corrected ego vehicle data that are output by the prediction processing unit 34, and using the corrected ego vehicle data as necessary, a correspondence between the detected object data and the predicted object data.

When there are a plurality of object information sensors 1, the updated object data is a result of sensor fusion, in which pieces of the detected object data detected by the respective object information sensors 1 are combined or fused.

The correlation processing unit 35 outputs, to the update processing unit 36, correlation data, which is obtained by combining the detected object data, the predicted object data, and the corrected ego vehicle data with the determined correspondence.

The update processing unit 36 is configured to update the updated object data with an input of the correlation data that is output by the correlation processing unit 35, using the detected object data and the predicted object data that are included in the correlation data and correspond to each other, and further using the corrected ego vehicle data as necessary. Moreover, the update processing unit 36 outputs the updated object data to the prediction processing unit 34, and outputs the updated object data and the corrected ego vehicle data to the information notification device 4 and the vehicle control device 5.

The information notification device 4 is configured to provide, with inputs of the updated object data and the corrected ego vehicle data that are output by the update processing unit 36, a visual or auditory notification of information in accordance with the updated object data and the corrected ego vehicle data. For example, when expecting a collision between the ego vehicle and a front vehicle based on the updated object data and the corrected ego vehicle data, the information notification device 4 controls an alarm unit to sound an alarm, or controls a display to display a message regarding the expected collision.

The vehicle control device 5 is configured to control, with inputs of the updated object data and the corrected ego vehicle data that are output by the update processing unit 36, operation of the vehicle in accordance with the updated object data and the corrected ego vehicle data. For example, when determining that the collision between the ego vehicle and the front vehicle is unavoidable based on the updated object data and the corrected ego vehicle data, the vehicle control device 5 performs control to apply a brake.

For example, there may be adopted a mode in which the object information sensor 1, the vehicle information sensor 2, the object recognition device 3, the information notification device 4, and the vehicle control device 5 are connected to a control area network (CAN), Ethernet, and other such in-vehicle networks to transmit and receive data based on respective predetermined protocols.

Figure 2:
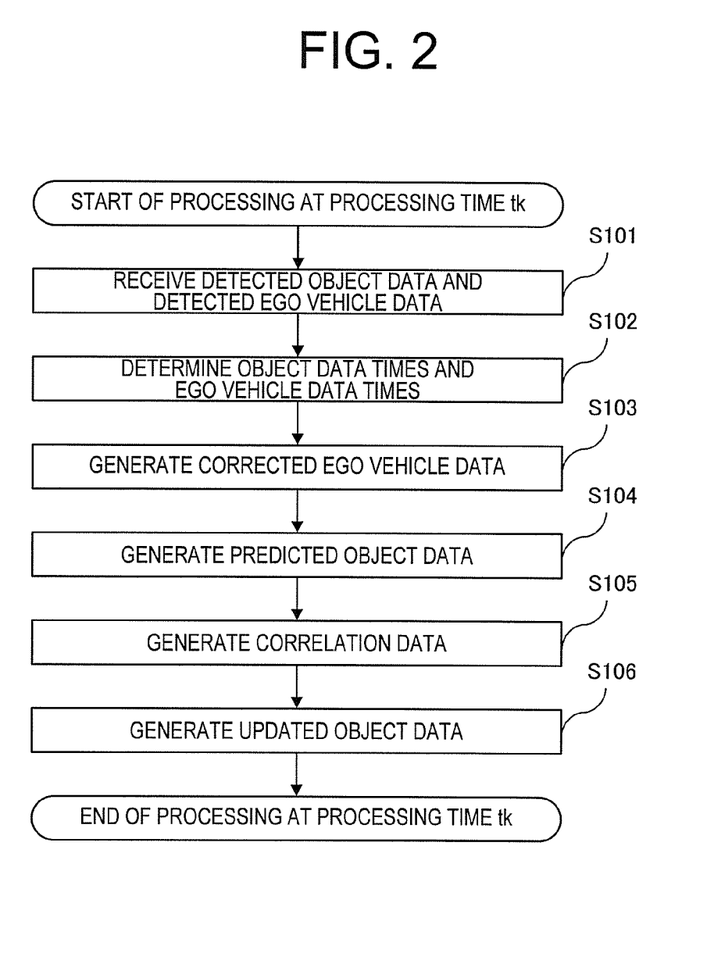
FIG. 2 is a flowchart for illustrating operation of an object recognition device according to the first embodiment of the present invention.

Next, operation of the object recognition device 3 according to the first embodiment is described with reference to FIG. 2. FIG. 2 is a flow chart for illustrating the operation of the object recognition device 3 according to the first embodiment of the present invention. The object recognition device 3 executes the following operation repeatedly at a predetermined duty cycle. In FIG. 2, operation in one duty cycle (processing time tk) is illustrated.

In Step S101, the data receiving unit 32 receives the detected object data from the object information sensor 1, and receives the detected ego vehicle data from the vehicle information sensor 2. Moreover, the data receiving unit 32 stores the detected object data and the detected ego vehicle data that have been received in the data storage unit 33 along with the times at which the respective pieces of data have been received.

Subsequently, in Step S102, the data receiving unit 32 determines, for pieces of the detected object data that have been received in a period from an immediately preceding processing time tk−1 to the processing time tk and are stored in the data storage unit 33, the times at which the respective pieces of detected object data are received as the object data times to be associated with the respective pieces of detected object data. Similarly, the data receiving unit 32 determines, for pieces of the detected ego vehicle data that have been received in the period from the processing time tk−1 to the processing time tk and are stored in the data storage unit 33, the times at which the respective pieces of detected ego vehicle data are received as the ego vehicle data times to be associated with the respective pieces of detected ego vehicle data.

Each of the object data times and the ego vehicle data times that are determined in Step S102 is a real value that is larger than the previous processing time tk−1 and the current processing time tk or less.

For example, internal times may be synchronized between the object information sensor 1 and the vehicle information sensor 2. Then, the object information sensor 1 may incorporate a generation time of generating the detected object data into the detected object data, and the vehicle information sensor 2 may incorporate a generation time of generating the detected ego vehicle data into the detected ego vehicle data before inputting to the data receiving unit 32. In this case, the data receiving unit 32 determines, for the detected object data that has been received, the generation time at which the detected object data is generated as the object data time to be associated with the detected object data. Similarly, the data receiving unit 32 determines, for the detected ego vehicle data that has been received, the generation time at which the detected ego vehicle data is generated as the ego vehicle data time to be associated with the detected ego vehicle data.

It should be noted, however, that it is not always the case that the internal times can be synchronized between the object information sensor 1 and the vehicle information sensor 2, and it is not always the case that the respective sensors can measure the generation times in the first place. Therefore, it is desired, as described above, for the time measuring unit 31 to measure the common time, and for the data receiving unit 32 to determine, as the object data time, the common time at the timing at which the detected object data is received from the object information sensor 1, and to determine, as the ego vehicle data time, the common time at the timing at which the detected ego vehicle data is received from the vehicle information sensor 2.

The data receiving unit 32 outputs, along with ego vehicle data, the object data time and the ego vehicle data time that have been determined to the prediction processing unit 34. The data receiving unit 32 also outputs the detected object data to the correlation processing unit 35.

As described above, the data receiving unit 32 associates, for the detected object data and the detected ego vehicle data that have been received in the period from the previous processing time (processing time tk−1) to the current processing time (processing time tk), the object data time with each piece of the detected object data, and the ego vehicle data time with each piece of the detected ego vehicle data, and outputs the detected object data, the object data time, the detected ego vehicle data, and the ego vehicle data time.

Subsequently, in Step S103, the prediction processing unit 34 predicts, using pieces of the detected ego vehicle data at the ego vehicle data times that are input from the data receiving unit 32, the detected ego vehicle data at the object data time to generate a result of the prediction as the corrected ego vehicle data. The examples of the generation of the corrected ego vehicle data are described later. The prediction processing unit 34 outputs the corrected ego vehicle data that has been generated to the correlation processing unit 35.

Subsequently, in Step S104, the prediction processing unit 34 predicts, using the updated object data that is input from the update processing unit 36, and further using the corrected ego vehicle data as necessary, the updated object data at the object data time to generate a result of the prediction as the predicted object data. The prediction processing unit 34 outputs the predicted object data that has been generated to the correlation processing unit 35.

As described above, the prediction processing unit 34 predicts, for the pieces of detected ego vehicle data at the ego vehicle data times, the detected ego vehicle data at the object data time to generate and output a result of the prediction as the corrected ego vehicle data. Moreover, the prediction processing unit 34 predicts, for the updated object data that is input from the update processing unit 36, the updated object data at the object data time to generate and output a result of the prediction as the predicted object data.

Subsequently, in Step S105, the correlation processing unit 35 determines, using the corrected ego vehicle data as necessary, the correspondence between the detected object data and the predicted object data.

The correlation processing unit 35 determines the correspondence between the detected object data and the predicted object data using a simple nearest neighbor (SNN) algorithm, a global nearest neighbor (GNN) algorithm, or a joint probabilistic data association (JPDA) algorithm, for example.

The correlation processing unit 35 outputs, to the update processing unit 36, the correlation data, which is obtained by combining the detected object data, the predicted object data, the corrected ego vehicle data, and the correspondence between the detected object data and the predicted object data.

As described above, the correlation processing unit 35 determines the correspondence between the detected object data and the predicted object data to generate and output the combination of the corrected ego vehicle data, the detected object data, the predicted object data, and the correspondence therebetween as the correlation data.

Subsequently, in Step S106, the update processing unit 36 updates, using the detected object data and the predicted object data that correspond to each other and are based on the correspondence between the detected object data and the predicted object data included in the correlation data, the updated object data that has been updated and output at the processing time tk−1, to thereby generate the updated object data at the object data time.

The update processing unit 36 updates the updated object data using the least-squares method, the Kalman filter, or a particle filter, for example.

The update processing unit 36 outputs, to the prediction processing unit 34, the updated object data that is updated at the processing time tk, that is, the updated object data at the object data time, and further outputs, to the information notification device 4 and the vehicle control device 5, the updated object data, and the corrected ego vehicle data at the object data time. Thereafter, the processing at the processing time tk is ended.

As described above, the update processing unit 36 generates, using the detected object data and the predicted object data that correspond to each other, the updated object data at the object data time, and outputs the updated object data and the corrected ego vehicle data at the object data time.

Figure 3:
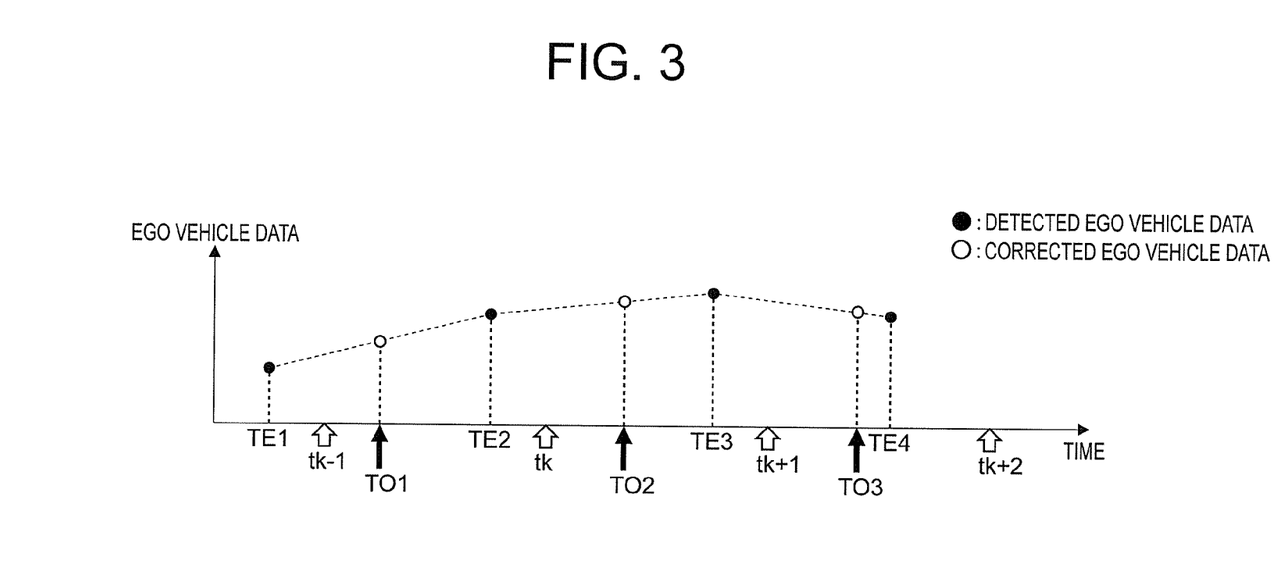
FIG. 3 is a timing chart for showing a first processing example of generating corrected ego vehicle data by a prediction processing unit of the first embodiment of the present invention.
Figure 4:
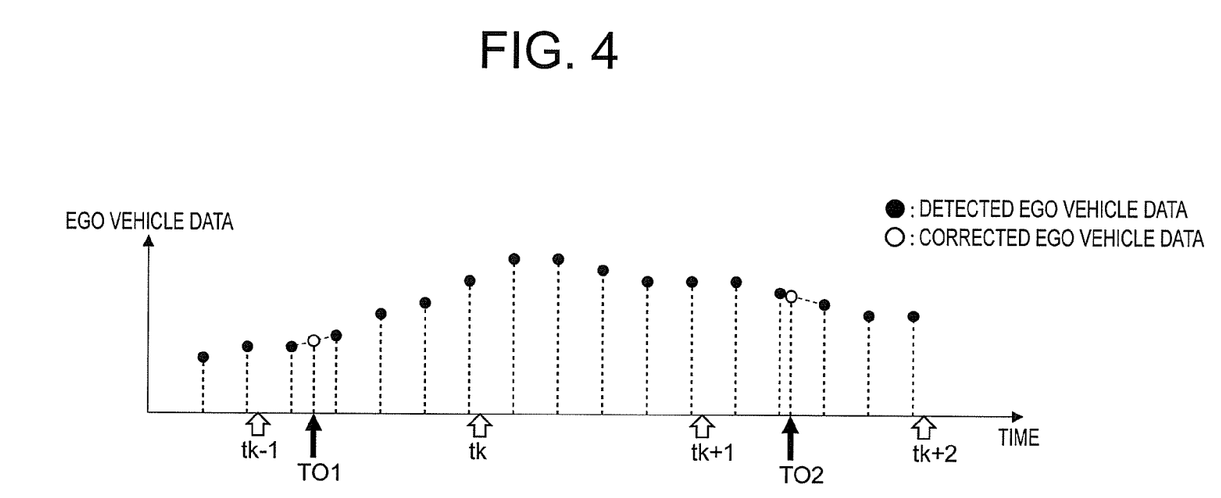
FIG. 4 is a timing chart for showing a second processing example of generating the corrected ego vehicle data by the prediction processing unit of the first embodiment of the present invention.
Figure 5:
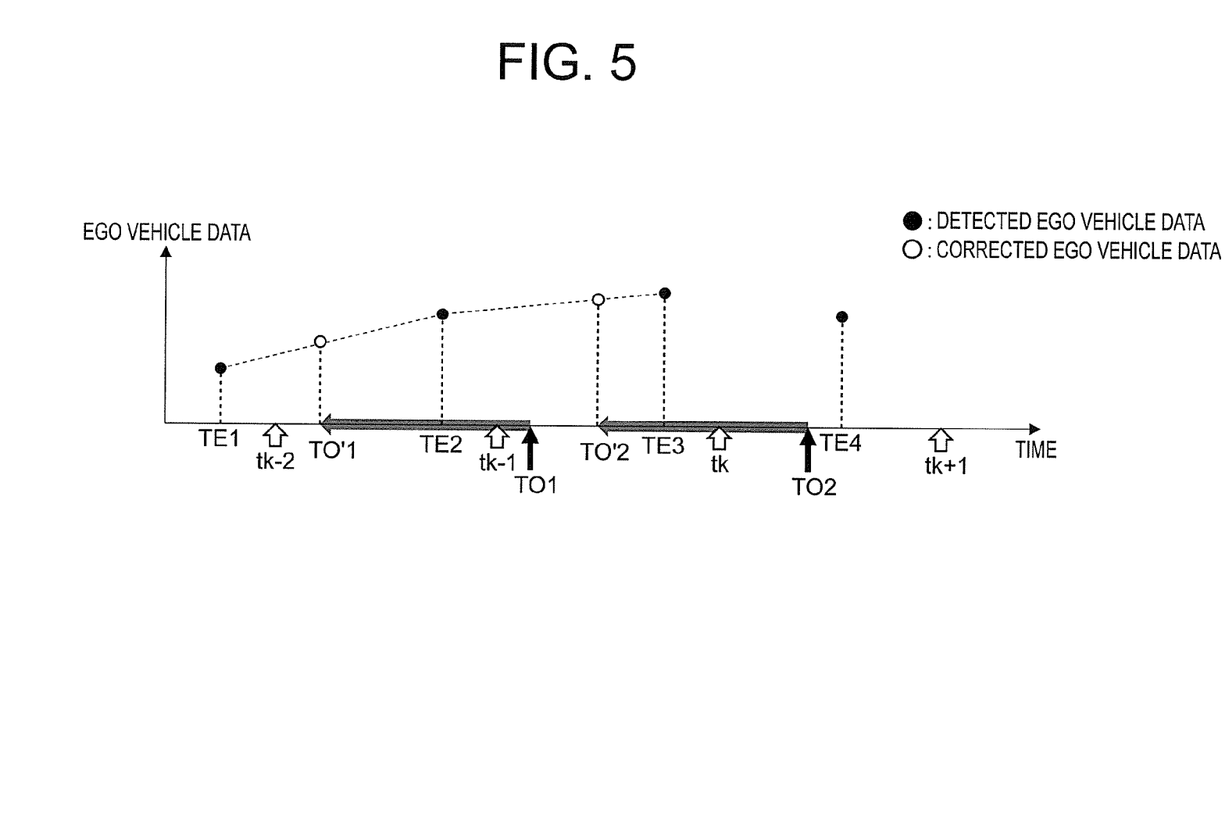
FIG. 5 is a timing chart for showing a third processing example of generating the corrected ego vehicle data by the prediction processing unit of the first embodiment of the present invention.

Next, the examples of the method of generating the corrected ego vehicle data are described with reference to FIG. 3 to FIG. 5. FIG. 3 to FIG. 5 are timing charts for showing first to third processing examples of generating the corrected ego vehicle data by the prediction processing unit 34 of the first embodiment of the present invention.

Here, it is not always the case that the detection of the detected object data by the object information sensor 1 and the detection of the detected ego vehicle data by the vehicle information sensor 2 are synchronized, and hence the object data time and the ego vehicle data time are generally different from each other. Moreover, in the situations in which the ego vehicle is stopped, is traveling straight ahead at a constant velocity, or is turning at a constant velocity and a constant steering angle, the detected ego vehicle data is constant, and hence there is no need to generate the corrected ego vehicle data.

However, in the situations in which the ego vehicle is being accelerated or decelerated, or is turning while the steering angle is changed, the detected ego vehicle data is not constant. In such situations, in order to calculate an absolute velocity of the object corresponding to the detected object data, or to determine whether or not the object corresponding to the detected object data is a stationary object, for example, there is a need to accurately estimate the ego vehicle data at the object data time associated with the detected object data. In other words, there is a need to match the detected object data and the detected ego vehicle data in time.

Therefore, in the first embodiment, in order to address the above-mentioned situations, there is adopted the configuration in which the detected ego vehicle data at the object data time associated with the detected object data is predicted to generate a result of the prediction as the corrected ego vehicle data.

First, the first processing example of the generation of the corrected ego vehicle data is described with reference to FIG. 3. In FIG. 3, it is assumed that the prediction processing unit 34 has acquired the object data times, the detected ego vehicle data, and the ego vehicle data times from the data receiving unit 32 as follows.

(1) At the processing time tk−1, a piece of the detected ego vehicle data is acquired along with an ego vehicle data time TE1 associated with the piece of detected ego vehicle data.

(2) At the processing time tk, a piece of the detected ego vehicle data is acquired along with an ego vehicle data time TE2 associated with the piece of detected ego vehicle data, and an object data time TO1 is further acquired.

(3) At the processing time tk+1, a piece of the detected ego vehicle data is acquired along with an ego vehicle data time TE3 associated with the piece of detected ego vehicle data, and an object data time TO2 is further acquired.

(4) At the processing time tk+2, a piece of the detected ego vehicle data is acquired along with an ego vehicle data time TE4 associated with the piece of detected ego vehicle data, and an object data time TO3 is further acquired.

At the processing time tk, the prediction processing unit 34 predicts, using pieces of the detected ego vehicle data at a plurality of suitable ego vehicle data times before the processing time tk, a piece of the detected ego vehicle data at the object data time TO1 to generate a result of the prediction as the corrected ego vehicle data.

Specifically, for example, the prediction processing unit 34 generates, as the corrected ego vehicle data at TO1, a piece of the ego vehicle data that is obtained by internally dividing at TO1, that is, linearly approximating at TO1 the piece of detected ego vehicle data at TE1 and the piece of detected ego vehicle data at TE2 in a coordinate system shown in FIG. 3.

At the processing time tk+1, the prediction processing unit 34 predicts, using pieces of the detected ego vehicle data at a plurality of suitable ego vehicle data times before the processing time tk+1, a piece of the detected ego vehicle data at the object data time TO2 to generate a result of the prediction as the corrected ego vehicle data.

Specifically, for example, the prediction processing unit 34 generates, as the corrected ego vehicle data at TO2, a piece of the ego vehicle data that is obtained by internally dividing at TO2 the piece of detected ego vehicle data at TE2 and the piece of detected ego vehicle data at TE3 in the coordinate system shown in FIG. 3.

Also at the processing time tk+2, the prediction processing unit 34 performs operation similar to that described above to generate the corrected ego vehicle data at TO3.

Without limiting to such method as in the above-mentioned specific example, the prediction processing unit 34 may predict the corrected ego vehicle data in any method as long as the corrected ego vehicle data at the object data time can be predicted and generated using the pieces of detected ego vehicle data at the plurality of suitable ego vehicle data times before the current processing time.

Without limiting to such method as in the above-mentioned specific example, the prediction processing unit 34 may predict, by processing the pieces of detected ego vehicle data at the ego vehicle data times before the current processing time with a time-series filter, the detected ego vehicle data at the object data time to generate the corrected ego vehicle data. Specifically, for example, assuming that the ego vehicle moves with a certain acceleration, the prediction processing unit 34 predicts an ego vehicle velocity at the object data time and the like using the least-squares method, the Kalman filter, and other such methods.

First, the second processing example of the generation of the corrected ego vehicle data is described with reference to FIG. 4. In FIG. 4, it is assumed that the prediction processing unit 34 has acquired the object data times, the detected ego vehicle data, and the ego vehicle data times from the data receiving unit 32 as follows.

(1) At the processing time tk−1, two pieces of the detected ego vehicle data are acquired along with ego vehicle data times associated with the respective pieces of detected ego vehicle data.

(2) At the processing time tk, five pieces of the detected ego vehicle data are acquired along with ego vehicle data times associated with the respective pieces of detected ego vehicle data, and the object data time TO1 is further acquired.

(3) At the processing time tk+1, five pieces of the detected ego vehicle data are acquired along with ego vehicle data times associated with the respective pieces of detected ego vehicle data.

(4) At the processing time tk+2, five pieces of the detected ego vehicle data are acquired along with ego vehicle data times associated with the respective pieces of detected ego vehicle data, and the object data time TO2 is further acquired.

Moreover, in the situation shown in FIG. 4, as compared to the situation shown in FIG. 3 described above, an acquisition rate of the detected ego vehicle data, which is acquired by the data receiving unit 32 from the vehicle information sensor 2, is higher. The second processing example is processing that is effective when the acquisition rate of the detected ego vehicle data, which is acquired by the data receiving unit 32 from the vehicle information sensor 2, is high.

At the processing time tk, the prediction processing unit 34 predicts, using pieces of the detected ego vehicle data at a plurality of suitable ego vehicle data times before the processing time tk, a piece of the detected ego vehicle data at the object data time TO1 to generate a result of the prediction as the corrected ego vehicle data.

As described above, those pieces of detected ego vehicle data are stored along with the ego vehicle data times associated with the respective pieces of detected ego vehicle data in the data storage unit 33, and hence the prediction processing unit 34 acquires the detected ego vehicle data that is required for the prediction together with the ego vehicle data time from the data storage unit 33.

Specifically, for example, in a coordinate system shown in FIG. 4, the prediction processing unit 34 selects, from the pieces of detected ego vehicle data at the plurality of suitable ego vehicle data times before the processing time tk+1, two pieces of the detected ego vehicle data that temporarily and immediately precedes and succeeds the object data time TO1. The prediction processing unit 34 generates, as the corrected ego vehicle data at TO1, a piece of the ego vehicle data that is obtained by internally dividing the two pieces of detected ego vehicle data at TO1.

Also at the processing time tk+2, the prediction processing unit 34 performs operation similar to that described above to generate the corrected ego vehicle data at TO2.

As described above, the prediction processing unit 34 predicts, by linearly approximating, of the pieces of detected ego vehicle data at the ego vehicle data times before the current processing time, the pieces of detected ego vehicle data at the ego vehicle data times that temporarily and immediately precedes and succeeds the object data time, the piece of detected ego vehicle data at the object data time to generate the corrected ego vehicle data.

First, the third processing example of the generation of the corrected ego vehicle data is described with reference to FIG. 5. In FIG. 5, it is assumed that the prediction processing unit 34 has acquired the object data times, the detected ego vehicle data, and the ego vehicle data times from the data receiving unit 32 as follows.

(1) At the processing time tk−2, a piece of the detected ego vehicle data is acquired along with an ego vehicle data time TE1 associated with the piece of detected ego vehicle data.

(2) At the processing time tk−1, a piece of the detected ego vehicle data is acquired along with an ego vehicle data time TE2 associated with the piece of detected ego vehicle data.

(3) At the processing time tk, a piece of the detected ego vehicle data is acquired along with an ego vehicle data time TE3 associated with the piece of detected ego vehicle data, and an object data time TO'1 considering delay time with respect to TO1 is further acquired.

(4) At the processing time tk+1, a piece of the detected ego vehicle data is acquired along with an ego vehicle data time TE4 associated with the piece of detected ego vehicle data, and an object data time TO'2 considering delay time with respect to TO2 is further acquired.

Moreover, in the situation shown in FIG. 5, as compared to the situation shown in FIG. 3 described above, with respect to the time at which the object information sensor 1 detected the detected object data, the time at which the data receiving unit 32 received the detected object data is delayed. In other words, without associating the object data time TO1, which is the reception time at which the detected object data was received from the object information sensor 1 in the period from the processing time tk−1 to the processing time tk, with the detected object data, the data receiving unit 32 associates the time TO'1, which is a time preceding TO1, with the detected object data considering the above-mentioned delay. The same applies to a relationship between the object data time TO2 and the time TO'2 considering the delay.

The third processing example is processing that is effective in a case where delay time, which is generated when the time at which the data receiving unit 32 received the detected object data is delayed with respect to the time at which the object information sensor 1 detected the detected object data, is taken into consideration.

At the processing time tk, the data receiving unit 32 associates the time TO'1, which is obtained by subtracting the delay time from the reception time TO1, as the object data time with the detected object data that was received at the time TO1. The delay time, that is, a time difference between TO1 and TO'1 is a previously known value.

In this case, as described above, the prediction processing unit 34 acquires the detected ego vehicle data together with the ego vehicle data time TE3 associated with the detected ego vehicle data, and further acquires the object data time TO'1 from the data receiving unit 32.

At the processing time tk, the prediction processing unit 34 predicts, using pieces of the detected ego vehicle data at a plurality of suitable ego vehicle data times before the processing time tk, a piece of the detected ego vehicle data at the object data time TO'1 to generate a result of the prediction as the corrected ego vehicle data.

As described above, those pieces of detected ego vehicle data are stored along with the ego vehicle data times associated with the respective pieces of detected ego vehicle data in the data storage unit 33, and hence the prediction processing unit 34 acquires the detected ego vehicle data that is required for the prediction together with the ego vehicle data time from the data storage unit 33.

Specifically, for example, the prediction processing unit 34 generates, as the corrected ego vehicle data at TO'1, a piece of the ego vehicle data that is obtained by internally dividing at TO'1 the piece of detected ego vehicle data at TE1 and the piece of detected ego vehicle data at TE2 in the coordinate system shown in FIG. 5.

Also at the processing time tk+1, the prediction processing unit 34 performs operation similar to that described above to generate the corrected ego vehicle data at TO'2.

As described above, for each piece of the detected object data that has been received, the data receiving unit 32 determines the reception time from the time measured by the time measuring unit 31, and further determines the time obtained by subtracting the delay time from the determined reception time, to thereby associate the determined time as the object data time with the each piece of the detected object data.

As with the determination of the object data times TO1' and TO2' described above, the data receiving unit 32 may determine the ego vehicle data time considering the delay time, which is generated when the time at which the data receiving unit 32 received the detected ego vehicle data is delayed with respect to the time at which the vehicle information sensor 2 detected the detected ego vehicle data. In other words, for each piece of the detected ego vehicle data that has been received, the data receiving unit 32 may determine the reception time from the time measured by the time measuring unit 31, and further determine the time obtained by subtracting the delay time from the determined reception time, to thereby associate the determined time as the ego vehicle data time with the each piece of the detected ego vehicle data.

As described above, according to the first embodiment, there is adopted the configuration in which, for the detected object data and the detected ego vehicle data that are received from the respective sensors in the period from the previous processing time to the current processing time, the object data time is associated with each piece of the detected object data and the ego vehicle data time is associated with each piece of the detected ego vehicle data, the detected ego vehicle data at the object data time is predicted to generate a result of the prediction as the corrected ego vehicle data, and the updated object data at the object data time is predicted to generate a result of the prediction as the predicted object data.

Further, in addition to the above-mentioned configuration, there is adopted the configuration in which the correspondence between the detected object data and the predicted object data is determined to generate and output the combination of the corrected ego vehicle data, the detected object data, the predicted object data, and the correspondence as the correlation data, and using the detected object data and the predicted object data that are included in the correlation data and correspond to each other, the updated object data at the object data time is generated to output the updated object data and the corrected ego vehicle data at the object data time.

As a result, by referring to the updated object data and the corrected ego vehicle data, the state of the object detected by the sensor mounted on the ego vehicle can be estimated. Moreover, even when the reception timings of data input from the object information sensor and the vehicle information sensor are asynchronous, or when there is an input delay for each sensor, in accordance with the time associated with the detected object data, the detected ego vehicle data at the time is predicted to match the detected object data and the detected ego vehicle data in time, with the result that more accurate estimation of the state of the object can be expected.

What is claimed is:

1. An object recognition device, which is configured to generate and output updated object data and corrected ego vehicle data based on detected object data received from an object information sensor, and on detected ego vehicle data received from a vehicle information sensor, the object recognition device comprising a microcomputer comprising:
   a time measuring unit configured to measure a time;
   a data receiving unit configured to associate, for the detected object data and the detected ego vehicle data that are received in a period from a previous processing time immediately preceding a current processing time to the current processing time, a time measured by the time measuring unit as an object data time with each piece of the detected object data, and a time measured by the time measuring unit as an ego vehicle data time with each piece of the detected ego vehicle data to output the detected object data, the object data time, the detected ego vehicle data, and the ego vehicle data time;
   a prediction processing unit configured to predict, with inputs of the object data time, the detected ego vehicle data, and the ego vehicle data time that are output by the data receiving unit, the detected ego vehicle data at the object data time to generate and output a result of the prediction as the corrected ego vehicle data, and predict, with inputs of the updated object data, and the object data time that is output by the data receiving unit, the updated object data at the object data time to generate and output a result of the prediction as predicted object data;
   a correlation processing unit configured to determine, with inputs of the detected object data that is output by the data receiving unit, and the predicted object data and the corrected ego vehicle data that are output by the prediction processing unit, a correspondence between the detected object data and the predicted object data to generate and output a combination of the corrected ego vehicle data, the detected object data, the predicted object data, and the correspondence as correlation data; and
   an update processing unit configured to generate, with an input of the correlation data that is output by the correlation processing unit, and using the detected object data and the predicted object data that correspond to each other, the updated object data at the object data time to output the updated object data and the corrected ego vehicle data at the object data time,
   wherein the detected ego vehicle data comprises a first detected ego vehicle data and a second detected ego vehicle data that are respectively detected at a first time point and a third time point, and the detected object data comprises a first object data that is detected at a second time point preceding the third time point and subsequent to the first time point, and
   wherein in response to the ego vehicle being accelerated or decelerated:
      the prediction processing unit is further configured to predict the ego vehicle data corresponding to a corrected second time point that precedes the second time point of the object data time by a predetermined delay time, at the current processing time that is subsequent to the third time point, based on the first detected ego vehicle data at a corrected first time point that precedes the first time point by the predetermined delay time, and the second detected ego vehicle data at a corrected third time point that precedes the third time point by the predetermined delay time, so that a delay between a reception time and a processing time of the ego vehicle data is compensated by the predetermined delay time, and
      the update processing unit generates the updated object data based on the predicted ego vehicle data,
   wherein in response to the ego vehicle traveling at a constant speed:
      the object recognition device is configured to recognize a target object based on the detected object data, without generating and using the updated object data.

2. The object recognition device according to claim 1, wherein the data receiving unit is configured to:
   determine, for each piece of the detected object data that has been received, the reception time based on the time measured by the time measuring unit, and associate the reception time as the object data time with the each piece of the detected object data; and
   determine, for each piece of the detected ego vehicle data that has been received, a reception time based on the time measured by the time measuring unit, and associate the reception time as the ego vehicle data time with the each piece of the detected ego vehicle data.

3. The object recognition device according to claim 1, wherein the data receiving unit is configured to determine, for each piece of the detected object data that has been received, the reception time based on the time measured by the time measuring unit, further determine a time obtained by subtracting the predetermined delay time from the determined reception time, and associate the determined time as the object data time with the each piece of the detected object data.

4. The object recognition device according to claim 3, wherein the data receiving unit is configured to determine, for each piece of the detected ego vehicle data that has been received, the reception time based on the time measured by the time measuring unit, further determine a time obtained by subtracting the predetermined delay time from the determined reception time, and associate the determined time as the ego vehicle data time with the each piece of the detected ego vehicle data.

5. The object recognition device according to claim 1, wherein the prediction processing unit is configured to predict, by processing pieces of the detected ego vehicle data at the ego vehicle data times before the current processing time with a time-series filter, a piece of the detected ego vehicle data at the object data time to generate the corrected ego vehicle data.

6. The object recognition device according to claim 1, wherein the prediction processing unit is configured to predict, by linearly approximating, of pieces of the detected ego vehicle data at the ego vehicle data times before the current processing time, pieces of the detected ego vehicle data at the ego vehicle data times that temporarily and immediately precedes and succeeds the object data time, a piece of the detected ego vehicle data at the object data time to generate the corrected ego vehicle data.

7. The object recognition device according to claim 1, wherein the object recognition device is included in a vehicle control system, and
wherein the vehicle control system comprises a vehicle control device configured to control a vehicle in accordance with the updated object data and the corrected ego vehicle data that are output by the object recognition device.

8. The object recognition device according to claim 7, wherein the vehicle control system comprises a display or an alarm system to provide a notification of information in accordance with the updated object data and the corrected ego vehicle data.

9. An object recognition method for generating and outputting updated object data and corrected ego vehicle data based on detected object data received from an object information sensor, and on detected ego vehicle data received from a vehicle information sensor, the object recognition method comprising:
associating, for the detected object data and the detected ego vehicle data that are received in a period from a previous processing time immediately preceding a current processing time to the current processing time, an object data time with each piece of the detected object data, and an ego vehicle data time with each piece of the detected ego vehicle data to output the detected object data, the object data time, the detected ego vehicle data, and the ego vehicle data time;
predicting, with inputs of the object data time, the detected ego vehicle data, and the ego vehicle data time, the detected ego vehicle data at the object data time to generate and output a result of the prediction as the corrected ego vehicle data, and predicting, with inputs of the updated object data and the object data time, the updated object data at the object data time to generate and output a result of the prediction as predicted object data;
determining, with inputs of the detected object data, the predicted object data, and the corrected ego vehicle data, a correspondence between the detected object data and the predicted object data to generate and output a combination of the corrected ego vehicle data, the detected object data, the predicted object data, and the correspondence as correlation data; and
generating, with an input of the correlation data, and using the detected object data and the predicted object data that correspond to each other, the updated object data at the object data time to output the updated object data and the corrected ego vehicle data at the object data time,
wherein the detected ego vehicle data comprises a first detected ego vehicle data and a second detected ego vehicle data that are respectively detected at a first time point and a third time point, and the detected object data comprises a first object data that is detected at a second time point preceding the third time point and subsequent to the first time point, and
wherein the predicting comprises:
in response to the ego vehicle being accelerated or decelerated, the predicting the ego vehicle data corresponding to a corrected second time point that precedes the second time point of the object data time by a predetermined delay time, at the current processing time that is subsequent to the third time point, based on the first detected ego vehicle data at a corrected first time point that precedes the first time point and the second detected ego vehicle data at a corrected third time point that precedes the third time point by the predetermined delay time, so that a delay between a reception time and a processing time of the ego vehicle data is compensated by the predetermined delay time, and the updated object data is generated based on the predicted ego vehicle data,
wherein the object recognition method further comprises in response to the ego vehicle traveling at a constant speed, recognizing a target object based on the detected object data, without generating and using the updated object data.

* * * * *